Feb. 14, 1928. 1,659,460
C. M. CONRADSON
MILLING MACHINE
Original Filed March 20, 1920 10 Sheets-Sheet 5

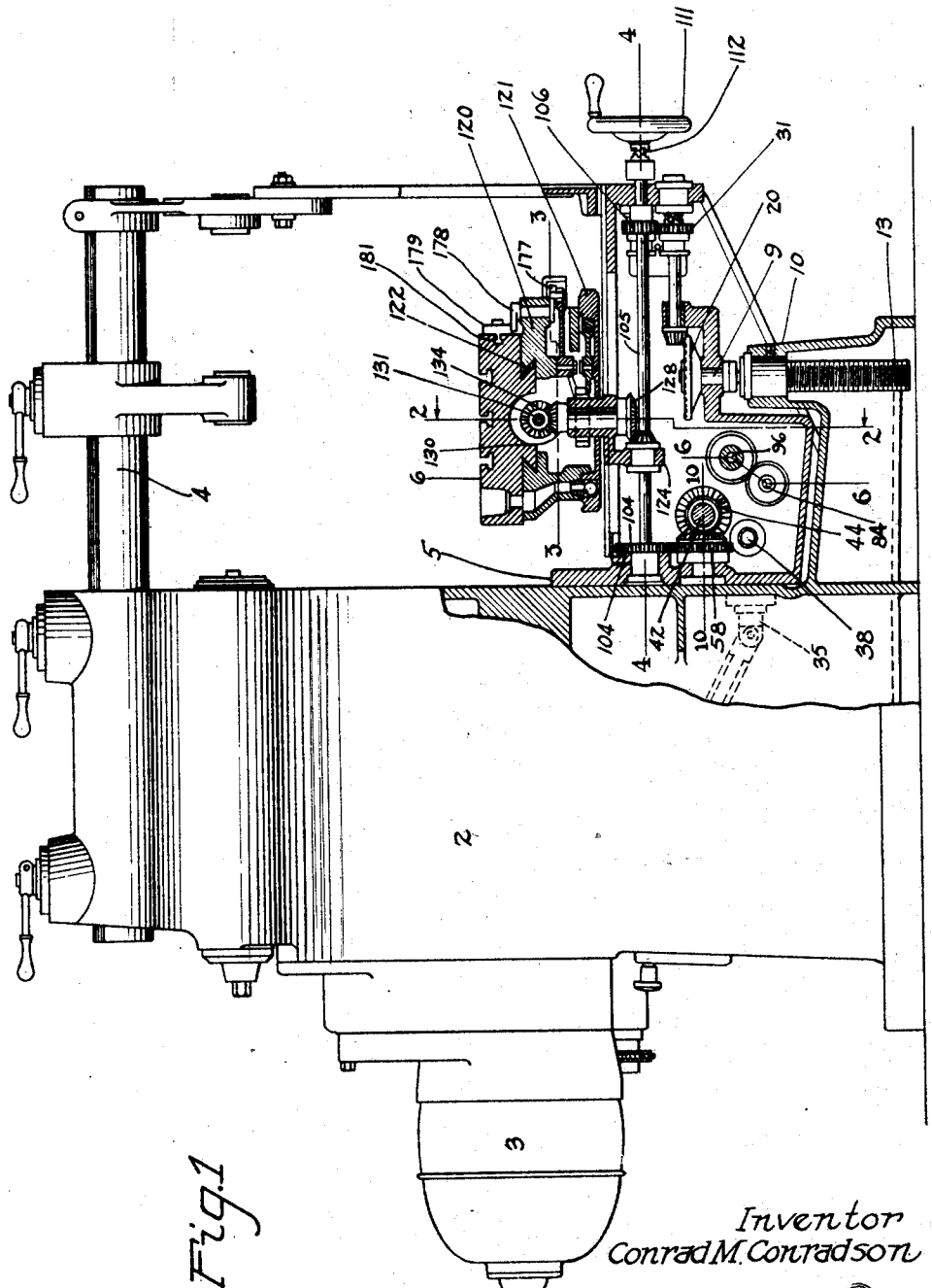

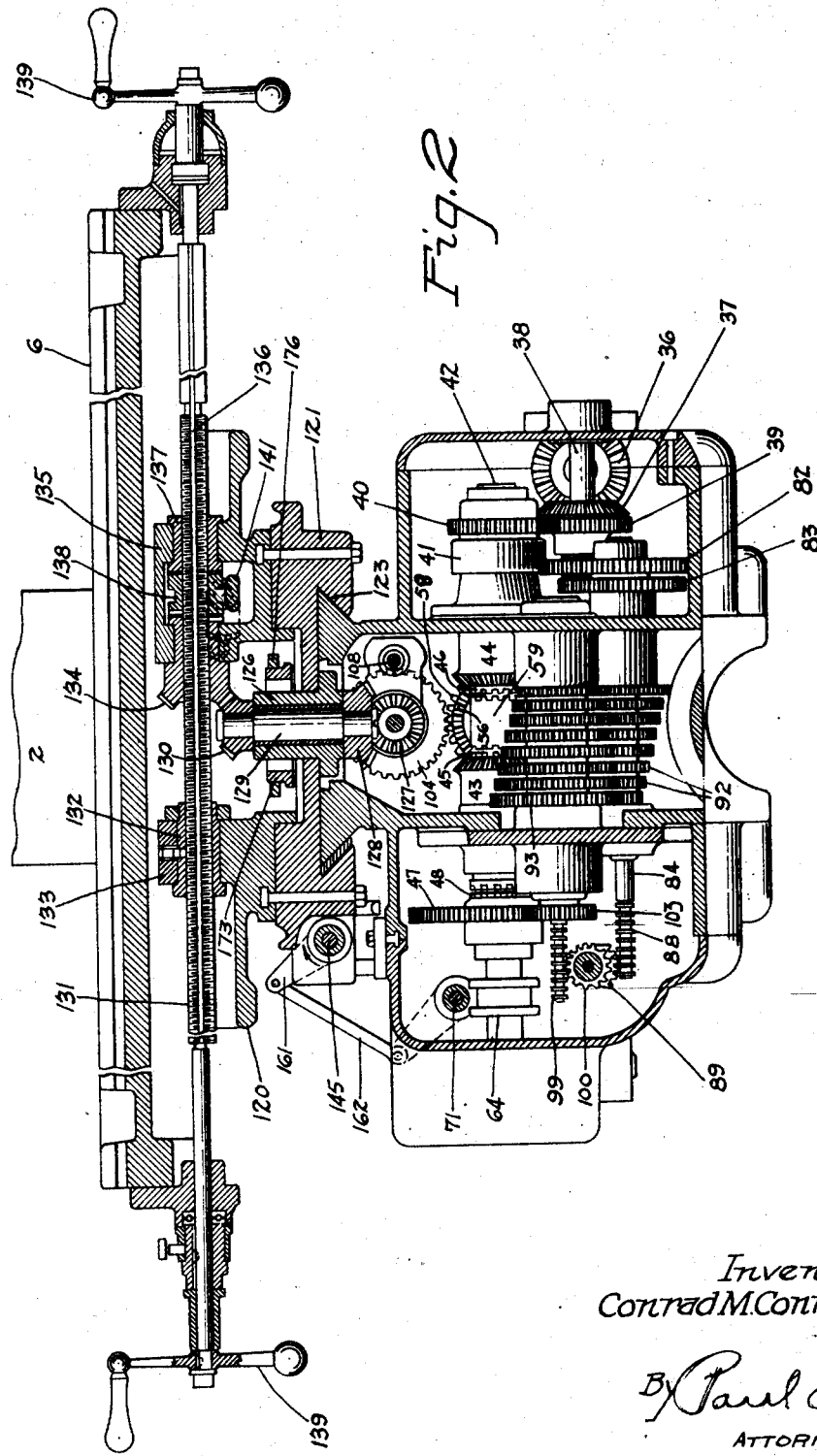

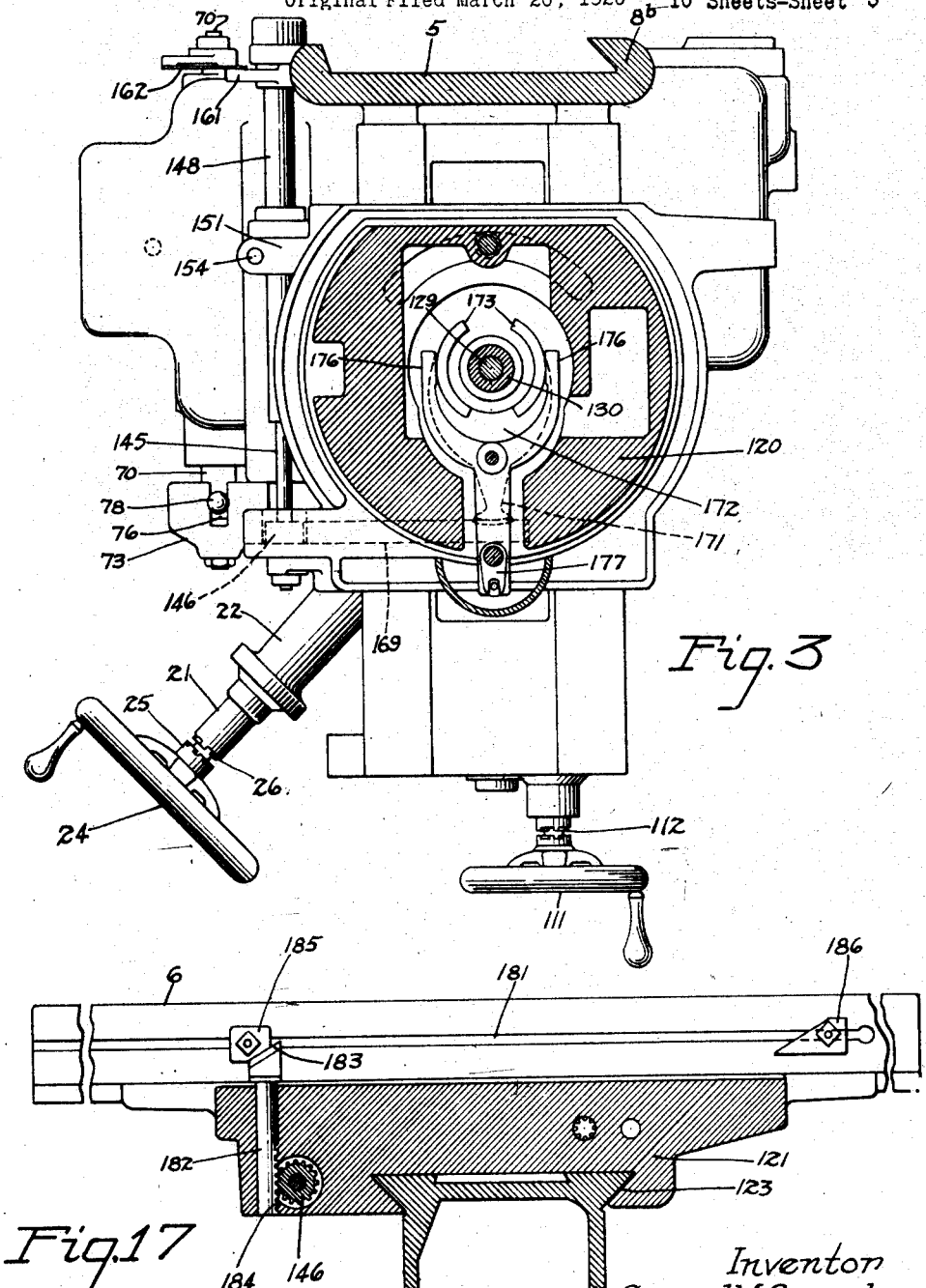

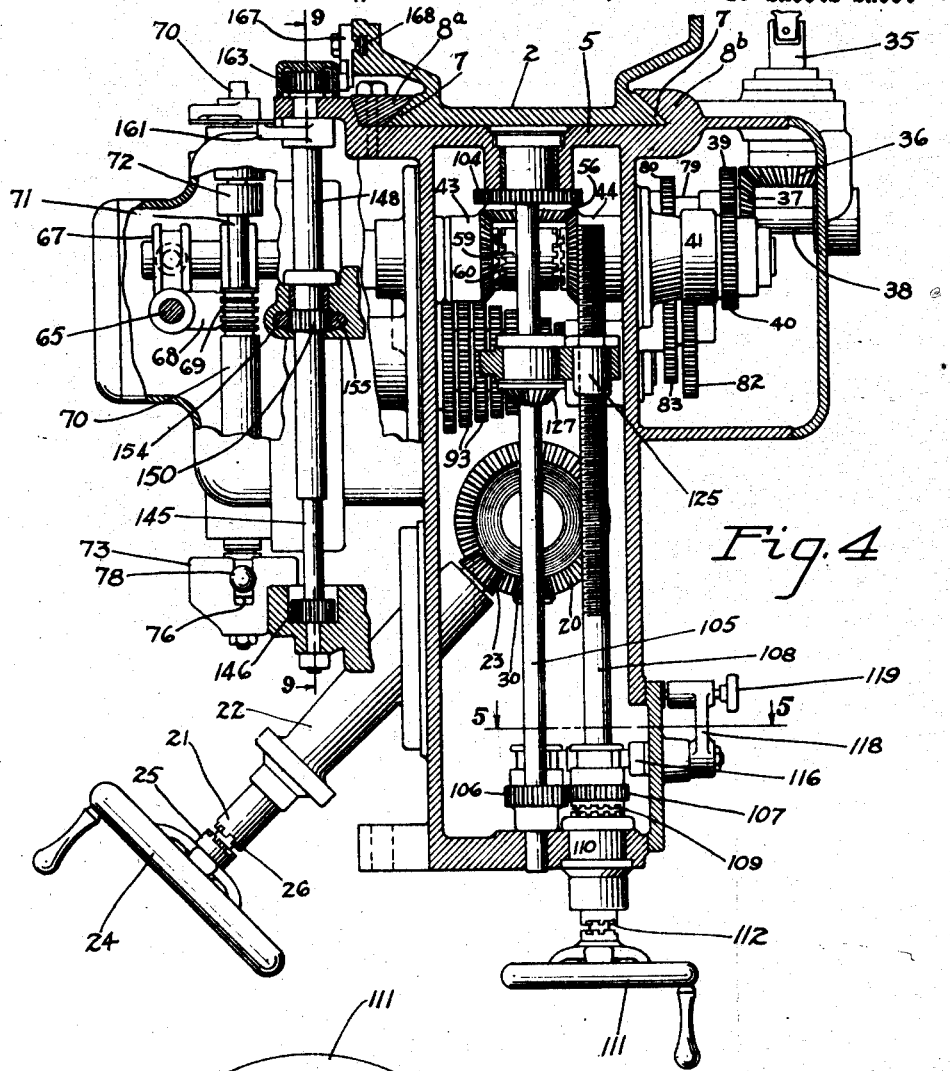

Inventor
Conrad M. Conradson
By Paul Paul
ATTORNEYS

Feb. 14, 1928.

C. M. CONRADSON

MILLING MACHINE

Original Filed March 20, 1920   10 Sheets-Sheet 6

1,659,460

Inventor
Conrad M. Conradson

By Paul & Paul
ATTORNEYS

Feb. 14, 1928.

C. M. CONRADSON 1,659,460

MILLING MACHINE

Original Filed March 20, 1920   10 Sheets-Sheet 7

Inventor
Conrad M. Conradson
By Paul & Paul
ATTORNEYS

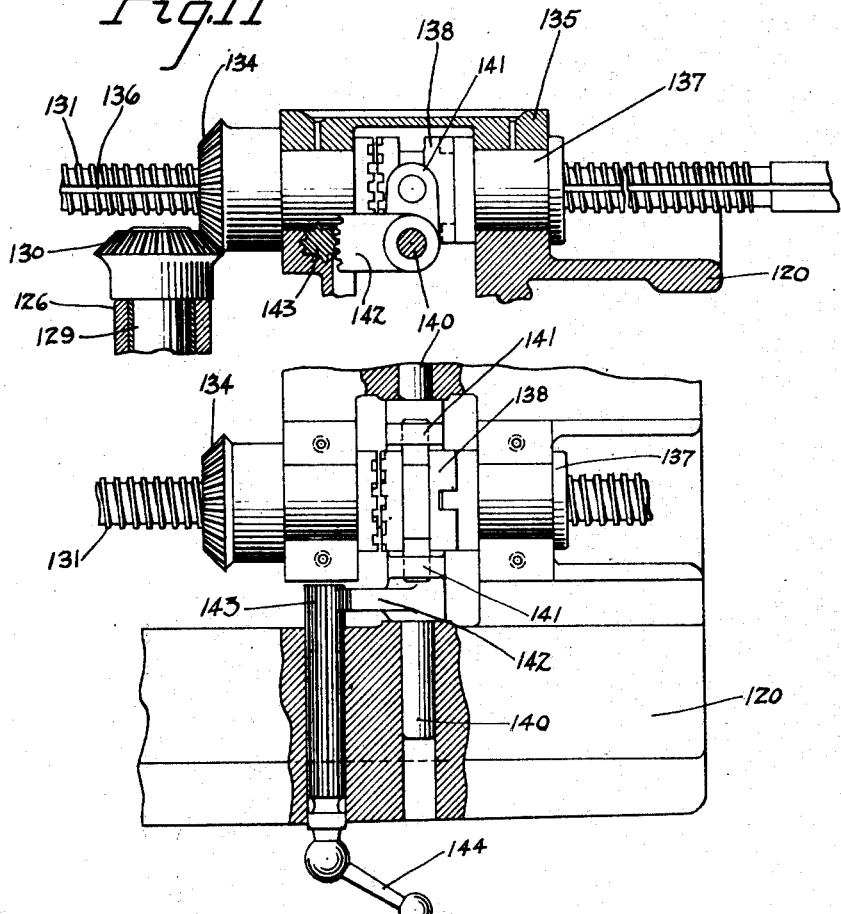

Feb. 14, 1928.
C. M. CONRADSON
MILLING MACHINE
Original Filed March 20, 1920   10 Sheets-Sheet 9
1,659,460
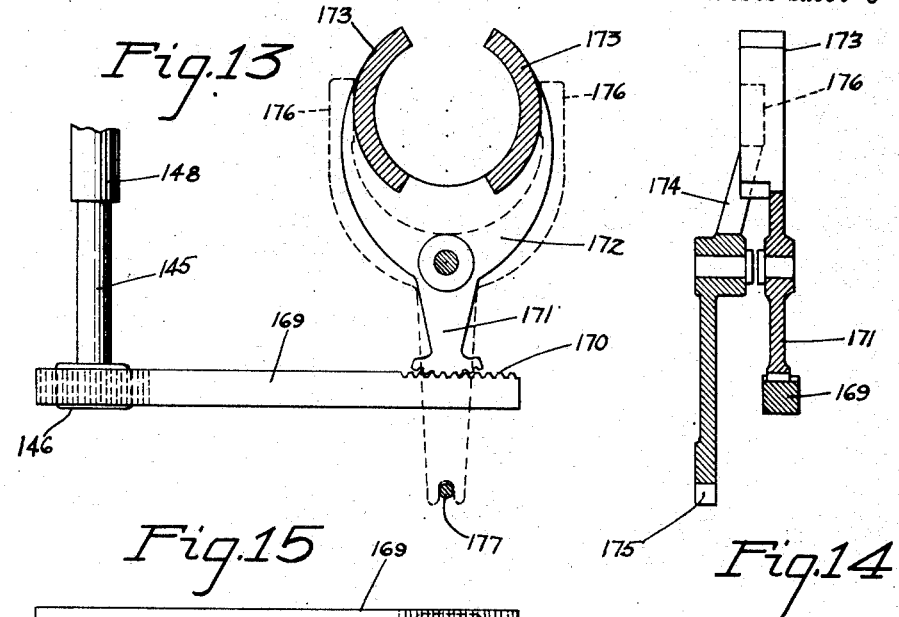
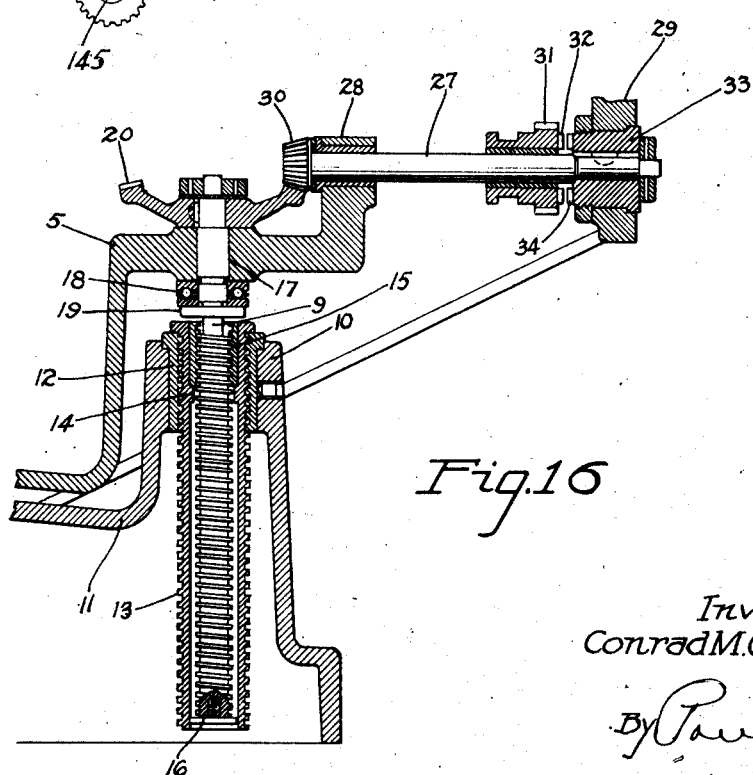
Inventor
Conrad M. Conradson
By Paul & Paul
ATTORNEYS Feb. 14, 1928.

C. M. CONRADSON 1,659,460

MILLING MACHINE

Original Filed March 20, 1920    10 Sheets-Sheet 10

INVENTOR
Conrad M. Conradson

By Paul & Paul
ATTORNEYS

Patented Feb. 14, 1928.

1,659,460

UNITED STATES PATENT OFFICE.

CONRAD M. CONRADSON, OF GREEN BAY, WISCONSIN, ASSIGNOR TO JOSEPH T. RYERSON & SON, OF CHICAGO, ILLINOIS, A CORPORATION OF ILLINOIS.

MILLING MACHINE.

Original application filed March 20, 1920, Serial No. 367,529. Divided and this application filed September 17, 1921. Serial No. 501,240.

My invention relates to improvements in variable speed mechanism for feeding the work to the milling cutter of a milling machine in both horizontal and vertical directions, coupled with automatic stop and traverse mechanism for the feed table of the machine.

The objects of the invention are:

1. To provide a variable feeding mechanism compactly embodied in the vertically movable knee of the machine, having a rapid, friction clutch driven, one-speed traverse of the knee and work-holding table and a positive jaw clutch-driven variable speed for the feed and also for both the forward and reverse drive.

2. To dispense with the usual multiplicity of levers and dials and substitute therefor two centrally located levers and one dial for controlling the feed speeds and traverse.

Other objects of the invention will appear from the following detailed description, taken in connection with the accompanying drawings.

The invention consists generally in various constructions and combinations, all as hereinafter described and particularly pointed out in the claims.

Figures 6, 7:
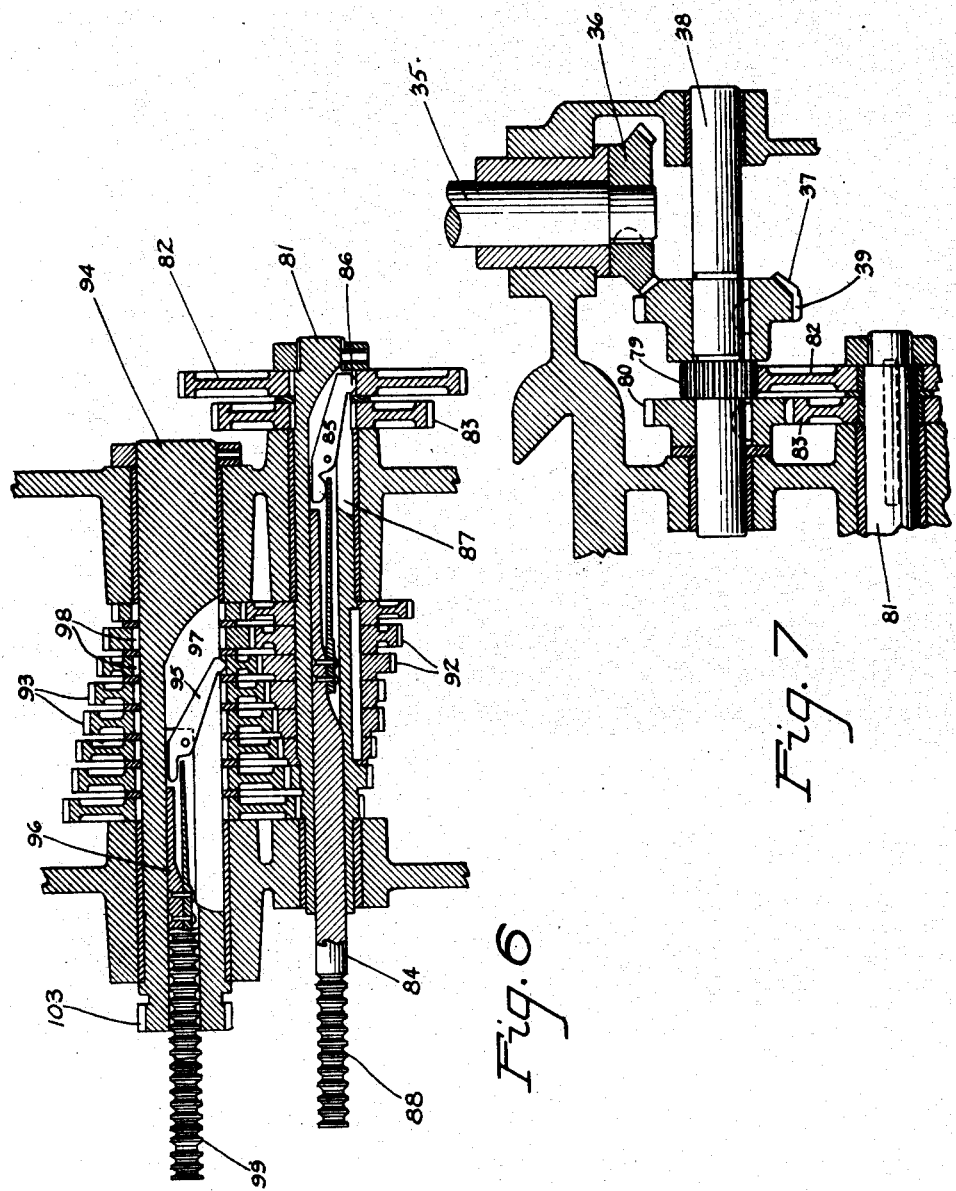
Figure 8:
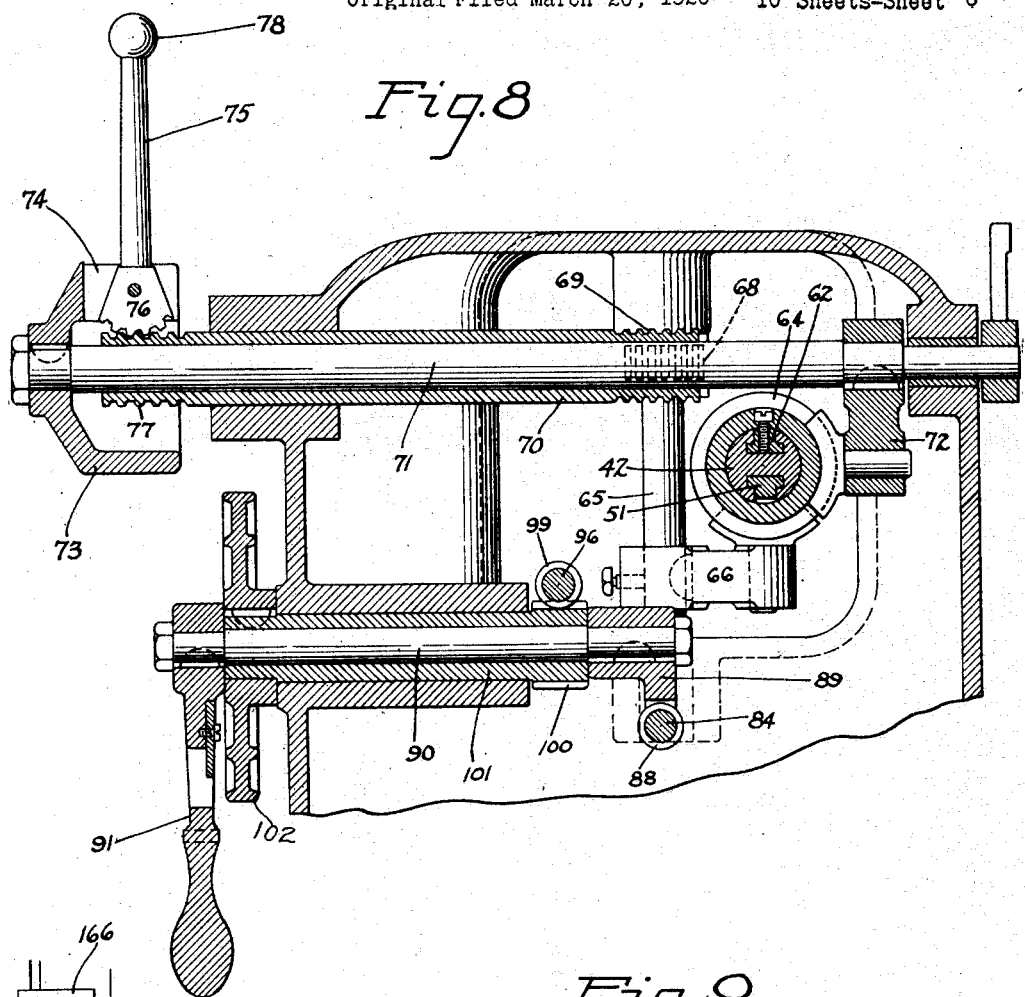
Figure 9:
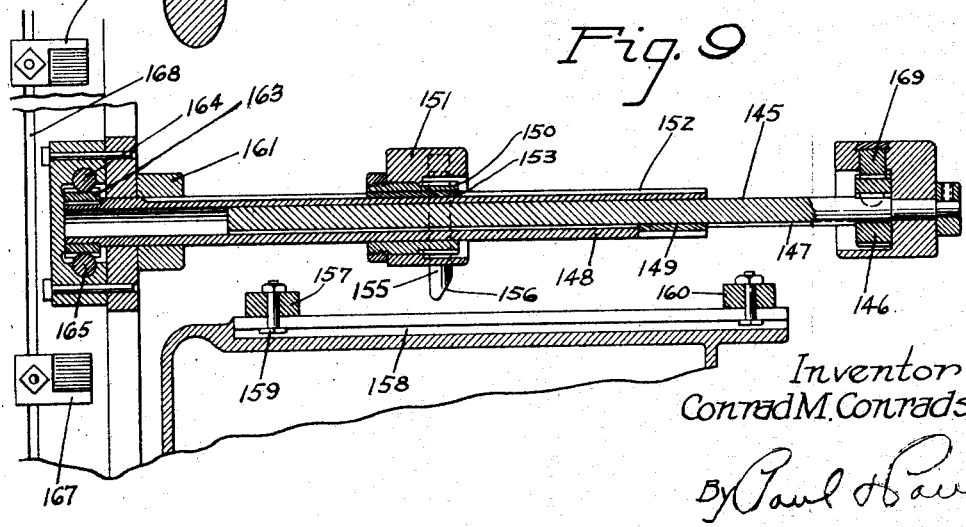
Figure 10:
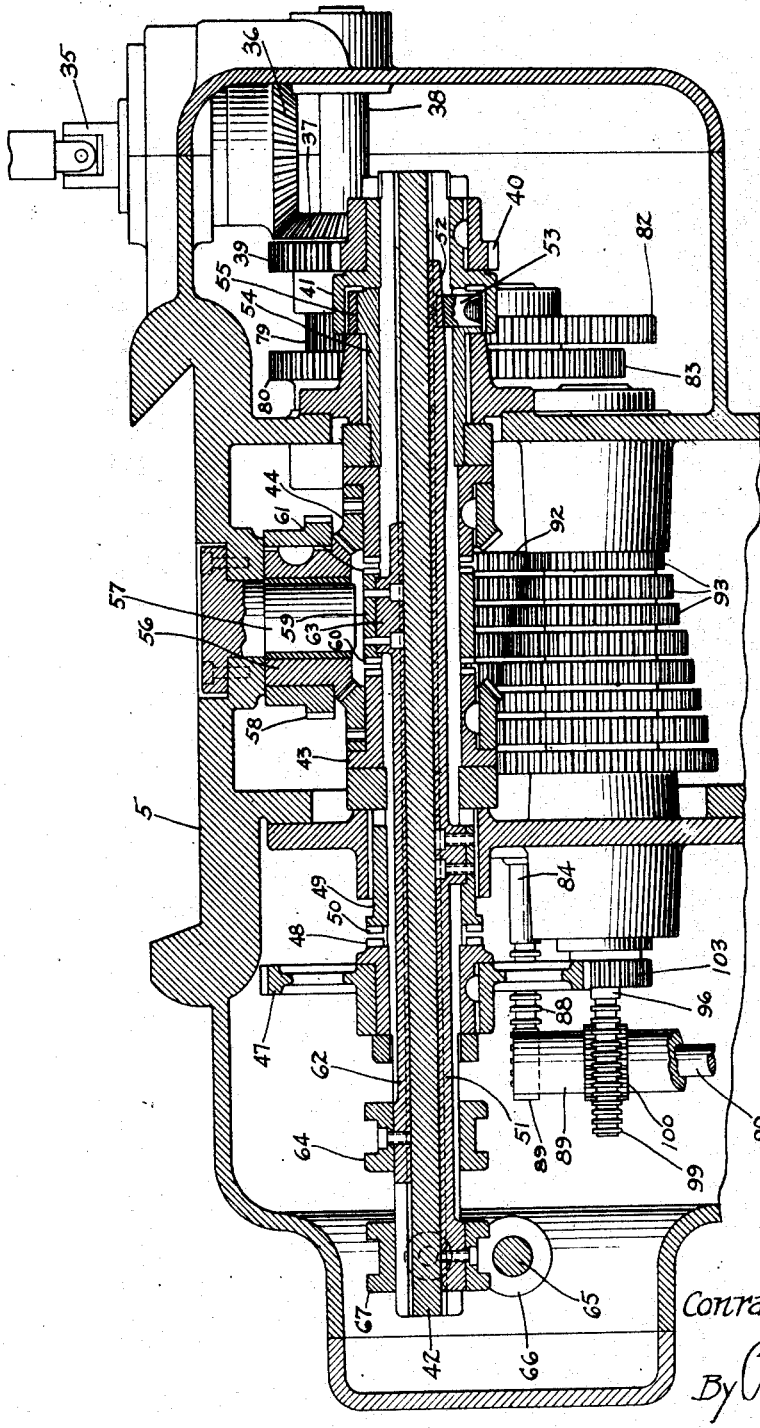
Figure 18:
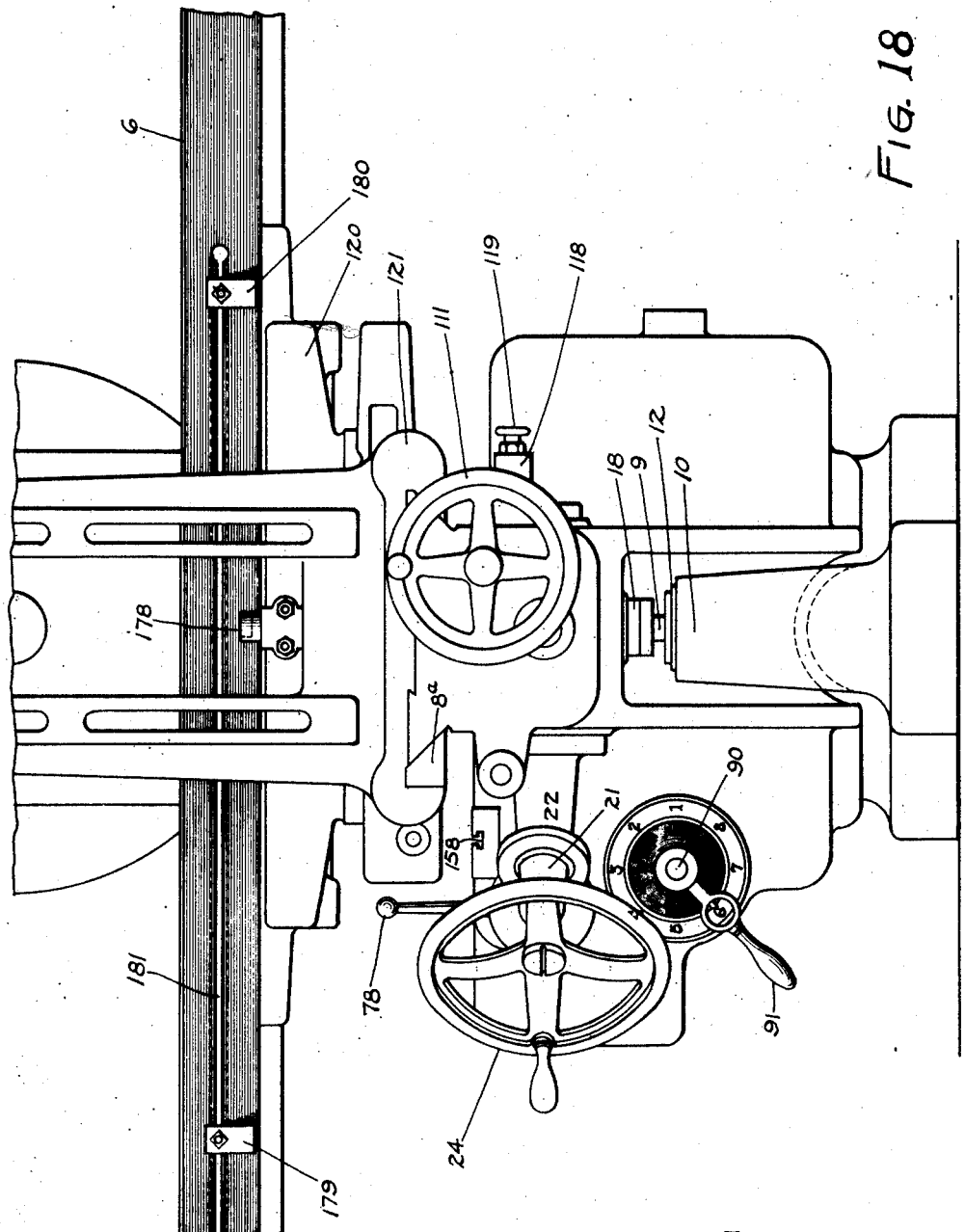

In the accompanying drawings forming part of this specification,

Figure 1 is a partial vertical longitudinal sectional view of a milling machine embodying my invention, Figure 2 is a vertical transverse section through the knee, on the line 2—2 of Figure 1, Figure 3 is a plan section on the line 3—3 of Figure 1, Figure 4 is a plan sectional view on the line 4—4 of Figure 1, Figure 5 is a sectional view on the line 5—5 of Figure 4, Figure 6 is a vertical transverse section through the knee, on the line 6—6 of Figure 1, Figure 7 is a detail view of the feed drive, Figure 8 is a sectional detail view through the lever control and time mechanism, Figure 9 is a sectional view on the line 9—9 of Figure 4, Figure 10 is a transverse plan section on the line 10—10 of Figure 1, Figure 11 is a detail sectional view of the clutch throwing mechanism for the feed shaft, Figure 12 is a plan view of Figure 11, Figures 13, 14 and 15 are detail sectional views of the clutch throwing mechanism for the feed shaft, Figure 16 is a sectional detail view of the knee elevating mechanism, Figure 17 is a detail view of a modified tripping mechanism for the plane type of milling machine, Figure 18 is a front end elevation of the machine, showing the control handles and dial.

In the drawing, 2 represents the main frame or column of the machine, 3 a motor for driving the spindle feed mechanism, not shown, and 4 a rigid overarm mounted in the upper portion of the column 2. 5 is the knee frame or housing, which carries a feed table 6 and embodies the feed mechanism, and is vertically adjustable upon the main frame or column 2. Two vertical V-shaped guide-ways 7, (see Figure 4) are provided upon the column 2 and are embraced by guide flanges 8ª and 8ᵇ of the knee housing 5.

An elevating screw 9 (see Figures 1 and 16) is mounted in a bearing block 10 upon a base member 11 projecting from the main column 2. An internally threaded stationary sleeve or nut 12 is arranged in the bearing block 10 and engages an externally threaded sleeve 13 having an annular internal flange 14. A second internally threaded nut 15 is tightly inserted into the sleeve 13 and bears against the flange 14. A screw 9 fits the thread of the nut 15 and a head 16 is secured to the lower end of the screw 9 and engages the flange 14 when the screw has been elevated to a predetermined point and arrests rotary movement of the screw relative to the sleeve, which will then rotate in the nut 12 if further elevation is to be effected. This telescopic screw construction is for the purpose of shortening the height of the elevating mechanism and increasing its elevating capacity.

The screw 9 is journaled at 17 in the knee frame and a suitable anti-friction step bearing 18 is provided between the flange 19 of the screw 9 and the knee frame 5 to carry the weight of the knee. A beveled gear 20 is keyed to the upper end of the screw 9 by means of which the screw is rotated and the knee raised or lowered. This may be accomplished either by power or manually, the latter being more particularly shown in Figure 4.

A shaft 21 (see Figure 4) mounted diagonally in bearings 22, carries a beveled pinion 23 in mesh with the beveled gear 20 and is provided with a hand wheel 24, loosely mounted on the shaft 21 and having a toothed hub or clutch 25 adapted to engage with a similar clutch 26 secured to the shaft 21. This described mechanism is for the purpose of raising the knee manually.

The power elevating mechanism consists in part of a shaft 27 (Figure 16) journaled in bearings 28 and 29 upon the knee frame 5 and having a beveled pinion 30 in mesh with the bevel gear 20 and a spur gear 31 loosely mounted on the shaft 27 and provided with clutch teeth 32. A sleeve 33, journaled in the bearing 29, is keyed to the shaft 27 and provided with clutch teeth 34 adapted to engage the clutch teeth 32 when the knee is to be elevated by power, as will hereinafter be referred to.

*The connection of the elevating mechanism with the motive power.*

Referring now to Figure 1, power is transmitted to a short shaft 35 mounted in bearings in the knee frame 5. This power transmission to the knee is common in milling machines and I claim no novelty for this construction. The shaft 35 carries a bevel gear 36 (see Figure 4) meshing with a bevel gear 37 on a short horizontal driving shaft 38. A spur gear 39 integral with the bevel gear 37 is in mesh with a spur gear 40 that is keyed to an external friction clutch member 41, loosely mounted upon a transverse clutch shaft 42 (see Figure 2). This shaft is journaled in suitable bearings and carries loosely mounted beveled gears 43 and 44 provided with clutch teeth 45 and 46 and the shaft also carries a large spur gear 47 having clutch teeth 48 (see Figures 2 and 10). A clutch sleeve 49 having clutch teeth 50 is connected to the shaft 42 by means of a feather key 51 arranged to slide in a groove in the shaft 42 and secured to the sleeve 49. This feather key is provided with an inclined cam surface 52 engaging a slot in the wedge block 53 that is radially movable in a collar 54 upon the shaft 42 and adapted, when forced outwardly, to expand a friction clutch ring 55 into clutching engagement with the friction clutch member 41. When the feather key 51 is moved toward the right, as shown in Figure 10, the clutch teeth 50 of the sleeve 49 will be disengaged from the clutch teeth 48 of the gear 47 and the inclined cam face 52 will have forced the clutch ring 55 into driving contact with the rotating clutch member 41 and the shaft 42 will be caused to revolve at high speed, driven direct from the gear 39 on the shaft 38. When the feather key is moved to the left, the friction clutch members will be released and the clutch sleeve 49 will engage the clutch teeth of the gear 47, driving the shaft 42 at a much slower and variable speed, as will hereinafter be fully described.

The bevel gears 43 and 44, as heretofore described, being loosely mounted on the shaft 42, are in constant mesh with a beveled gear 56, rotatively mounted upon a stationary stud 57 and rigidly connected to a spur gear 58. A clutch sleeve 59 having clutch teeth 60 and 61 has a driving connection with the clutch shaft 42 by means of a feather key 62. This key is rigidly secured to the clutch sleeve at 63. As shown in Figure 10, the clutch teeth of the sleeve 59 are in neutral position, but if the sleeve is moved to the left to engage the clutch teeth of the beveled gear 43, the shaft 42 will impart rotative movement to the beveled gear 56 in a given direction and if the sleeve is moved toward the right to engage the beveled gear 44, the gear 56 will be caused to rotate in the opposite direction. Means are provided for moving the feather keys 51 and 62 independently, but with the same lever, as follows:

Referring to Figures 2, 4, 8 and 10, a flange shifter collar 64 is secured to the key 62. A rock shaft 65 is mounted in vertical bearings and provided with a shifter arm 66 engaging the shifter collar 67 for the key 51 and a gear segment 68 in mesh with an annular rack 69 of a sleeve 70. This sleeve is loosely mounted upon a horizontal rock shaft 71 mounted in suitable bearings and provided with a shifter arm 72 engaging the shifter collar 64 for the key 62. Outside of the knee frame a shifter head 73 having a radial slot 74 is keyed to the shaft 71. A vertical universal shifter lever 75 fitting the slot 74 and having a gear segment 76 in mesh with an annular rack 77 is pivoted in the head 73. This lever is provided with a weighted upper end 78 to hold it in any one of the four horizontal positions. By this construction it will be seen that the shaft 71 may be rocked in either direction to correspondingly move the feather key 62 in the shaft 42 independently of the sleeve 70, and that the sleeve 70 may be moved to slide longitudinally upon the shaft 71 to rock the shaft 65 in either direction and move the feather key 51 independently of the rocker shaft 71 and the feather key 62. The movement of the feather key 62 reverses the rotation of the beveled gear 56, as heretofore described, and the movement of the feather key 51 changes the speed of the transmitting shaft by transferring the drive to the shaft from one to the other of the gears 52 and 47. The rapid traverse drive to the shaft 42 is effected through the friction clutch and small gear 40 and the slow variable drive through the toothed clutches 48 and 49 and the large gear 47. As the friction and toothed clutches are alternately engaged by moving the feather key 51 in opposite directions, it is evident that the clutches can never be simultaneously engaged. Power is transmitted from the shaft 38 to the large gear 47 through a variable speed drive mechanism, as follows:

Two different diameter gears 79 and 80 are secured to the driving shaft 38, the smaller gear 79 being formed, preferably, integral with the shaft. (See Figure 7.) A speed change transmission shaft 81 is provided with two loosely mounted gears 82 and 83 in mesh with the gears 79 and 80 respectively. The shaft 81 is hollow and is provided with an internal slidable rod 84 (see Figure 6) having a spring-pressed dive key 85 provided with a head 86 adapted to pass through a slot 87 in the shaft 81 and engage the gears 82 and 83, locking one or the other of these gears to the shaft and driving it at a corresponding speed.

The rod 84 is longitudinally movable in the shaft 81 by means of an annular rack 88 cut in the rod and in mesh with a segmental pinion 89 on a rock shaft 90 provided with an operating lever 91. By moving this lever, the dive key 85 may be moved to engage either one of the gears 82 or 83 and cause the shaft 81 to be driven at a corresponding speed.

A series of eight speed change gears 92 are keyed to the shaft 81 and in constant mesh with the corresponding speed change gears 93, loosely mounted upon an intermediate speed change shaft 94 (see Figure 6). A spring-pressed dive key 95 is pivoted to a rod 96 concentrically and slidably arranged within the shaft 94 and a slot 97 is cut in the shaft through which the head of the dive key 95 projects into a slot or groove 98 in the hub of the gears 93, thereby locking one of the gears to the shaft. Rings or washers, over which the head of the dive key passes when moving from gear to gear, separate the gears 93 and serve to lock the dive key and also to release it when the key is shifted from one gear to another. The dive key and the rod 96 are moved by means of a circular rack 99 in mesh with gear teeth 100, cut in a sleeve 101, loosely mounted on the shaft 90 and provided with a dial disc 102. By turning this dial, the dive key 95 may be brought into frictional engagement with any one of the side change gears and automatically locked in place. Suitable indexing marks may be provided on the dial disc for the guidance of the operator in indexing the proper speed change gears for the desired speed of the shaft 81. This speed is transmitted to the clutch shaft 42 by means of a pinion 103 cut integrally with the shaft 94 and in mesh with the large gear 47 and from the shaft 42 the speed is transmitted to the beveled gear 56 and spur gear 58 through the beveled gears 43 and 44, as heretofore described.

Referring to Figures 1, 2 and 10, power is transmitted from the spur gear 58 through a spur gear 104 to the feed operating shaft 105 journaled in bearings in the knee frame 5, which shaft transmits variable feed to the table feed and operating mechanism. A spur gear 106 is keyed to the shaft 105 and in constant mesh with a gear 107 loosely mounted on a threaded transverse feed shaft 108 having clutching engagement at 109 with a collar 110 that is splined on the shaft 108 and journaled against endwise movement in its bearing. The gear 106 also is in mesh with the gear 31, loosely mounted on the shaft 27 and having the short clutch teeth 32 (see Figure 16) engageable with the clutch teeth on the cam 33 splined to the shaft 27, as heretofore described.

The shaft 108 may be manually operated by means of the hand wheel 111 having clutch engagement at 112 with the collar 110. A short rocker spindle 113 is mounted in a plate 114 and is provided with oppositely projecting arms 115 and 116 having shifter connection to the grooved hubs of the clutch gears 117 and 31 respectively. An operating and indexing handle 118 having a suitable latch device 119 is secured to the spindle 113 for operating the shifter arms to throw the clutch teeth 32 and 109 into operative or inoperative connection with the collar clutch teeth controlling the power elevating shaft 27 and the feed shaft 108. It is obvious on account of the oppositely pointing shifter arms 115 and 116, one clutch unit can only be engaged at the same time and when one clutch unit is thrown into engagement, the other will be disengaged. The shifter arm 115 controls the power elevating mechanism and the shifter arm 116 and transverse table feed, as will hereinafter be described.

In the universal type of milling machine, herein illustrated, the feed table 6 having slots for holding the work, is mounted rotatably by means of a swiveled carriage 120 upon a saddle 121. The table slides longitudinally in suitable guideways 122 in the carriage and the saddle has a transverse movement to the length of the table on guideways 123 on the knee frame 5 (see Figure 2). A depending bracket 124 having a fixed, internally threaded nut 125 (see Figure 4) and a vertical bearing 126, is firmly secured to the saddle 121. The threads of the screw shaft 108 are in engagement with the internal threads of the nut 125, and when this shaft is revolved by the engagement of the clutch unit controlled by the shifter arm 115, the saddle and table will be moved transversely in a direction according to the direction of the screw shaft 108, driven by the feed driving shaft 105. This shaft 105 is splined and carries a beveled gear 127 rotatably mounted against endwise movement and meshing with a beveled gear 128 upon a vertical shaft 129 carrying an upper beveled gear 130 (see Figures 1 and 2).

A longitudinal feed screw 131 is rotatably mounted against endwise movement on the feed table 6 and engages the internal threads of a flanged nut 132 that is firmly fixed to the saddle bracket 133. A beveled gear 134 having clutch teeth is rotatably mounted in a second saddle bracket 135 and is in mesh with the beveled gear 130. The feed screw passing loosely through the beveled gear 134, is provided with a key-way 136 and a clutch sleeve 137 is journaled in the bracket 135 and provided with a tip key to slide in the key way 136. A shifter sleeve 138 is mounted to slide on the feed screw 131 between the bevel gear 134 and the clutch sleeve 137 and has clutch members at one end, permanently engaging the clutch sleeve and provided with clutch teeth at the other end which may be moved into and out of operative connection with the clutch teeth of the gear 134, thus starting and stopping the rotation of the feed screw 131 and controlling the longitudinal feeding of the table 6. Hand wheels or handles 139 are secured at each end of the feed screw by means of which the table may be moved when the shifter sleeve is separated from the driving beveled gear 134. The starting and stopping of the feed screw 131 may be performed manually by the manipulation of the shifter sleeve 138 by means of a rocket shaft 140 having yoked operating connections 141 with the shifter sleeve 138 and being provided with a rack arm 142 in mesh with a pinion 143 journaled in suitable bearings and having an operating lever 144 within convenient reach of the operator.

The automatic feed control.

Mechanism is provided for automatically controlling and stopping at predetermined points the longitudinal travel of the feed table 6, the transverse travel of the saddle 121 relative to the feed table and the knee and the vertical feed or elevation of the knee itself when the feeds are operated by power, and to effect this by automatically operating trips controlling a single clutch controlling, telescoping shaft.

Referring to Figures 2, 3, 4 and 9, the feed control shaft consists of a spindle 145 mounted in the saddle 121 and having a pinion 146, by which the spindle may be rotated, and a key-way 147. A sleeve 148 having bearings in the knee frame telescopically encloses the spindle 145 and carries an internal tit-key 149 engaging the key-way 147. The sleeve and spindle will thus rotate together, while permitting the free, transverse travel of the saddle 121 relative to the knee.

A toothed pinion 150, journaled and housed in a bracket 151 of the saddle through which the sleeve 148 passes, is slidably carried on the sleeve and rotatably connected to it by means of the external key-way 152, being engaged by a key 153 in the pinion 150. Trip pins 154 and 155 have rack connection with the pinion 150 and are provided at their lower ends with beveled surfaces 156 and cam plate 157 is adjustably secured in the path of the pin 154 and in a transverse T-slot 158 of the knee frame by means of a clamping bolt 159. A similar cam plate 160 is provided in the path of the pin 155 and when the saddle has traveled a predetermined distance in a forward direction, the trip pin 154 will be raised by the plate 157, rotating the pinion 150 and sleeve 148 in the direction of the arrow in Figure 2, and at the same time lowering the pin 155. An arm 161 is secured to the sleeve 148 and has link connection 162 upon the clutch shifter shaft 71 and when, therefore, the sleeve 148 is rocked, in the manner above described, the clutch sleeve 59 will be moved to the left and removed from clutching contact with the driving bevel 44 and the transverse feed of the saddle 121 will be stopped. Similarly, when the bevel gear 43 has been clutch connected with the sleeve 59 by means of the hand lever, as heretofore described, and the saddle is traveling in the opposite direction, the trip pin 155 will be raised by the cam plate 160 and the sleeve 148 will be rocked in the opposite direction to move the clutch sleeve 59 to the right, away from the clutch connection with the bevel gear 43, stopping the reverse feed of the saddle.

For the vertical control of the knee, (see Figures 4 and 9) a pinion 163 is carried by the sleeve 148 and trip pins 164 and 165, similar to the pins heretofore described, are arranged in a suitable housing and engage this pinion with their toothed ends. Cam plates 166 and 167 are adjustably secured in a T-slot 168 in the main column, operate according to the direction of the feeds to engage the pins 164 and 165, and rock the sleeve 148 at predetermined points in the vertical travel of the knee and through the mechanism, as above described, disengage the driving clutch sleeve 49 and stop the feed.

The trip mechanism for the control of the longitudinal travel of the feed tables operates the sleeve 148 through the telescopic shaft 145.

Referring to Figures 1, 3, 9 and 13 to 15 inclusive, a rack bar 169 is slidably supported in mesh with the pinion 146 and rack teeth 170 engage a toothed segment 171 upon an arm 172 pivoted to the carriage and having circular flange segements 173. A forked arm 174 having a slot 175 is pivoted to the saddle concentric to the arm 172 and its forked ends 176 engage the segments 173, as shown in Figure 14. The slot 175 is engaged by the crank arm of a trip dog 177 pivoted to the saddle (see Figure 1) and having an upper arm 178 arranged in the path of the trip blocks 179 and 180, adjustably secured in T-slots 181 of the feed table. As the trip legs 179 or 180 engage the dog 177 during the travel of the table to turn it according to the direction of the feed, the control sleeve 148 is rocked through the levers 172 and 174, rack bar 169, pinion 146 and shaft 105, with the result of again disengaging the clutch sleeve 49 and stopping the feed.

For the plane type of milling machine having no swiveled carriage, the construction of the feed table trip is shown in Figure 17, in which a trip pin 182 having a beveled flange 183 and a rack 184 is vertically mounted in the saddle. The rack 184 is in mesh with the gear or pinion 146 and trip plates 185 and 186 have inclined surfaces and are adjustably clamped in the slot 181 at the desired points for the length of travel of the feed table. As the table reaches this point, the inclined faces of the plates engage the beveled flange 183, raising or lowering it, accordingly as the table travels in one or the other direction, and by this rocking, the control shaft 145 and sleeve 148 release the clutch sleeve 49 and stop the feed. As will be seen from the foregoing, all the feeds may be started in the desired direction by turning the hand indexing lever to engage the clutch sleeve 49 with the proper bevel gear clutch running in the desired direction. The feeds are thereafter automatically stopped at the desired point and a rapid traverse may be effected by manipulating the same lever to slide the rack sleeve 70 and through the connecting elements move the dive key to disengage the slow forward speed and make friction clutch connection with the fast running clutch gear. It will be seen that this may be done, no matter in what direction the feeds are moving, and that it is entirely independent of the feed of the forward speed.

It will also be noted that the sixteen different feed speeds are controlled by a single dial and connecting lever, and that clutch means are provided, so that the transverse and vertical power feeds can not be put in operation at the same time, and that manually operated feeds are provided, independent of the power feeds.

It will also be seen that by the construction disclosed all the operating parts in both the main column and knee are enclosed in practically oil-tight compartments that may be partially filled with lubricants, thus making lubrication of the operating elements simple and effective and protecting them from injury.

This case is a division of application on milling machines, filed by me March 20, 1920, Serial No. 367,529.

I claim as my invention:

1. The combination, with a knee frame, of a drive shaft, a clutch shaft having a high speed driving clutch connection with said drive shaft, a forward and reverse driving connection for said clutch shaft and a mechanism for shifting said high speed driving clutch connection to operate or release said clutch shaft.

2. The combination, with a knee frame, of a drive shaft, a clutch shaft having a high speed driving clutch connection with said drive shaft, a forward and reverse driving connection for said clutch shaft, a rock shaft and sleeve concentric therewith operatively connected with said high speed driving clutch connection and with said forward and reverse driving connection, and a mechanism for operating said rock shaft and said sleeve to set or release said clutch connection or adjust said forward or reverse driving connection.

3. The combination, with a knee frame, of a drive shaft, a clutch shaft having a high speed driving clutch connection with said drive shaft, a variable speed driving connection between said drive shaft and said clutch shaft, and a lever operated mechanism mounted to set or release said high speed connection and adjust said variable speed driving connection.

4. The combination, with a knee frame, of a drive shaft, a clutch shaft having a high speed driving clutch connection with said drive shaft, a variable speed driving connection between said drive shaft and said clutch shaft, a forward and reverse driving connection, and a mechanism mounted to alternately render said high speed driving clutch connection and said variable speed driving connection operative or inoperative and for adjusting said forward and reverse driving connection in an operative or neutral position.

5. The combination, with a knee frame, of a drive shaft, a clutch shaft, a clutch having a driving connection with said drive shaft and loosely mounted on said clutch shaft, a gear loosely mounted on said clutch shaft and having a variable speed driving connection with said drive shaft, a clutch for locking said gear on said clutch shaft, a key mounted to operate said gear clutch and lock and release said high speed driving clutch, and means mounted to operate said key.

6. The combination, with a knee frame, of a drive shaft, a clutch shaft, a clutch loosely mounted thereon and having a driving connection with said drive shaft, a comparatively large gear loosely mounted on said clutch shaft, a locking clutch therefor, a variable speed driving connection between said gear and said drive shaft, a feather key for operating said locking clutch and for locking and releasing said high speed driving clutch, a forward and reverse clutch for said clutch shaft, a feather key connected therewith, and a lever mounted to operate said feather keys.

7. The combination, with a knee frame, of a drive shaft, means having a high speed driving connection with said drive shaft, a gear mounted on said means, mechanism for alternately rendering said high speed driving connection and said gear operative or inoperative, a variable speed driving connection between said drive shaft and said gear, and mechanism including a concentric lever and dial for shifting the gears of said variable speed driving connection to change the speed of said high speed means.

8. The combination, with a knee frame, of a drive shaft, a clutch shaft mounted therein, a gear mounted on said clutch shaft, a variable speed gearing connecting said drive shaft with said gear, means for locking or releasing said gear on said clutch shaft, said variable speed gearing comprising parallel shafts and gears of different diameter mounted thereon, and mechanism for locking or releasing said gears, including a concentric sleeve and shaft and an operating lever and indexing dial therefor.

9. The combination, with a knee frame, of a drive shaft, means having a high speed driving connection with said drive shaft, a forward and reverse driving connection for said means, a feed operating shaft geared to said forward and reverse driving connections, an elevating screw for said frame having a driving connection with said feed operating shaft, and mechanism for rendering said high speed driving connection and said forward and reverse driving connection operative or inoperative.

10. The combination, with a knee frame, of a drive shaft, a shaft having a high speed driving connection with said drive shaft, a forward and reverse driving connection for said high speed shaft, variable speed driving connections between said drive shaft and said high speed shaft, mechanism for rendering said high speed driving connection and said variable speed driving connection alternately operative or inoperative and for moving said forward and reverse driving connection to an operative or neutral position, a feed operating shaft geared to said forward and reverse driving connection, an elevating screw for said frame having a driving connection with said feed operating shaft, and an upright column having a guide for said frame.

11. The combination, with a knee frame, of a drive shaft, a shaft having a high speed driving connection with said drive shaft, a forward and reverse driving connection for said high speed shaft, mechanism for rendering said high speed driving connection and said forward and reverse driving connection operative or inoperative, a feed operating shaft, a carriage mounted on said knee frame, and a feed screw connected with said carriage and having driving connection with said feed operating shaft.

12. The combination, with a knee frame, of a drive shaft, a clutch shaft operatively connected therewith, a feed operating shaft geared to said clutch shaft, an elevating screw for said knee frame, a column whereon said frame is vertically movable, a carriage supported by said frame, a feed screw connected with said carriage and having a driving connection with said feed operating shaft, and means for rendering the driving connection between said elevating screw and said feed screw and said feed operating shaft alternately operative or inoperative.

13. The combination, with a knee frame, of a drive shaft, a shaft having a driving connection with said drive shaft, a feed operating shaft geared to said driven shaft, an elevating screw having a driving connection with said feed operating shaft, a column having a guide wherein said frame is vertically movable, a carriage supported on said frame, a feed screw connected with said carriage and having a driving connection with said feed operating shaft, mechanism for rendering the driving connection between said elevating screw and said feed screw and said feed operating shaft alternately operative or inoperative and manually operated means for operating said elevating screw and said feed screw.

14. The combination, with a knee frame, of a drive shaft, a clutch shaft having a driving connection with said drive shaft, a feed operating shaft operatively connected with said clutch shaft for forward and reverse movement, a carriage mounted on said knee frame and operatively connected with said feed operating shaft for forward and reverse movement of said carriage, a table mounted in said carriage for independent movement thereon, a feed screw for said table, and mechanism connecting said feed screw with said feed operating shaft.

15. The combination, with a column, of a knee frame mounted for vertical movement thereon, a feed operating shaft mounted in said frame, an elevating screw for raising and lowering said frame and geared to said feed operating shaft, a carriage mounted on said frame, a feed screw therefor operatively connected with said feed operating shaft, a table supported by said carriage, a feed screw for said table operatively connected with said feed operating shaft, and mechanism for revolving said feed operating shaft forward and reverse at a high speed or a variable speed.

16. The combination, with a column, of a knee frame mounted for vertical movement thereon, a feed operating shaft mounted in said frame, an elevating screw for raising and lowering said frame and geared to said feed operating shaft, a carriage mounted on said frame, a feed screw therefor operatively connected with said feed operating shaft, a table supported by said carriage, a feed screw for said table operatively connected with said feed operating shaft, and mechanism for revolving said feed operating shaft forward and reverse at a high speed or a variable speed, and levers and a dial for controlling the operation of said mechanism.

17. The combination, with a knee frame, of a feed operating shaft mounted therein, a carriage mounted on said frame, a feed screw connected with said carriage and having a driving connection with said feed operating shaft, mechanism for revolving said feed operating shaft forward and reverse at high speed or slower variable speeds, a shifting means for said mechanism, and means for automatically actuating said shifting means to stop the forward or reverse movement of said feed operating shaft.

18. The combination, with a knee frame, of a feed operating shaft mounted therein, a mechanism for revolving said shaft forward and reverse, a carriage mounted on said frame, a feed screw for said carriage having a driving connection with said feed operating shaft, means for controlling the operation of said feed operating shaft, and an automatic trip for said controlling means including telescoping members mounted respectively in said knee frame and said carriage and slidable one upon the other during the forward and reverse movement of said carriage.

19. The combination, with a knee frame, of a drive shaft, means having a driving connection with said drive shaft, a forward and reverse driving connection for said means, a carriage mounted on said frame, a feed operating shaft geared to said forward and reverse driving connections and having feeding connections with said carriage, a rock shaft, an operating lever therefor connected with said forward and reverse driving connections, and mechanism connected with said rock shaft and with said carriage for automatically rocking said shaft and shifting said forward and reverse driving connections at predetermined points in the travel of said carriage.

20. The combination, with a knee frame and a carriage mounted thereon, of mechanism for forward and reverse movement of said carriage, a controlling means for said mechanism and an automatic trip device comprising telescoping members mounted respectively in said knee frame and said carriage and having means for tripping said controlling means at predetermined points in the travel of said carriage.

21. The combination, with a column, of a knee frame vertically movable thereon, a carriage mounted to traverse said knee frame, a table supported by said carriage and having a feeding movement thereon, mechanism for raising and lowering said knee frame on said column for traversing said carriage on said knee frame and for feeding said table forward and backward, a controlling device for said mechanism, and means for automatically actuating said controlling device to check the movement of said knee frame, the traverse of said carriage and the feed of said table.

22. The combination, with a knee, of a carriage movable thereon and a table supported by said carriage, a column whereon said knee is vertically movable, mechanism for raising and lowering said knee, for traversing said carriage and feeding and reversing said table and a lever mounted for forward and backward and lateral movement and connected with said mechanism for controlling the movement of said knee, said carriage and said table.

23. The combination, with a knee, of a carriage mounted thereon, a table supported by said carriage, a column whereon said knee is vertically movable, mechanisms having high speed and low speed driving connections for raising and lowering said knee, traversing said carriage and feeding and reversing said table, and a lever mounted for a plurality of movements and connected with said driving connections for controlling the movement of said knee, said carriage and said table.

24. The combination, with a knee, of a carriage mounted thereon, a table supported by said carriage, a column whereon said knee is vertically movable, mechanism having high speed and low speed driving connections for raising and lowering said knee, traversing said carriage and feeding and reversing said table, and a lever mounted for four movements and connected with said driving connections for controlling the movement of said knee, said carriage and said table, and means for automatically operating said lever to stop said knee, said carriage or said table.

25. The combination, with a knee, of a carriage mounted thereon, a table supported by said carriage, a column whereon said knee is mounted, a friction clutch controlled mechanism for traversing said carriage, a positive jaw clutch controlled mechanism for feeding and reversing said table.

26. The combination, with a knee, of a carriage mounted thereon, a table supported by said carriage, a column whereon said knee is mounted, a friction clutch controlled mechanism for traversing said carriage, and positive jaw clutch controlled mechanism for feeding and reversing said table and levers and a dial for operating said clutches.

27. The combination with a knee frame, of a drive shaft, a clutch shaft, a clutch having a driving connection with said drive shaft and loosely mounted on said clutch shaft, a gear loosely mounted on said clutch shaft and having a variable speed driving connection with said drive shaft, a clutch for locking said gear on said clutch shaft, and means for operating said gear clutch and locking and releasing said high speed driving clutch.

28. The combination with a knee frame, of a drive shaft, a clutch shaft having a high speed driving clutch connection at one end with said drive shaft, the other end of said clutch shaft having a variable speed driving connection with said drive shaft, and a driving connection with said clutch shaft intermediate said high speed and variable speed driving connections.

29. The combination with a frame, of a carriage mounted thereon, a table supported by said carriage, a feed screw for said table, a feed operating shaft mounted in said knee frame, a carriage feed screw shaft mounted adjacent and parallel to said feed operating shaft, means for applying power to one end of said feed operating shaft, means at the other end of said feed operating shaft for driving said carriage screw shaft, and means movable on said feed operating shaft and connecting it with said table and carriage feed screws.

30. The combination with a knee frame, of a carriage and a table supported thereon, screw feed shafts for said carriage and table, a clutch shaft mounted transversely of said knee frame and having clutch controlled driving connections at one end and controlling means therefor near its opposite end, intermediate forward and reverse driving connections on said clutch shaft, a feed operating shaft mounted longitudinally of said knee frame and having driving connections with said forward and reverse gearing, and driving connections between said feed operating shaft and said carriage and table screw shafts.

31. The combination with a knee frame, of a carriage and table supported thereon, a clutch shaft mounted transversely of said knee frame and having clutch controlled driving connections at one end and controlling means therefor near its opposite end, intermediate forward and reverse driving connections on said clutch shaft, a feed operating shaft mounted longitudinally of said knee frame and having driving connections with said forward and reverse gearing, screw shafts for said carriage and said table, driving connections between said feed operating shaft and said screw shafts, and a vertically mounted screw shaft for said knee frame driven from said feed operating shaft.

32. The combination with a knee, of a carriage mounted thereon, means for traversing said carriage, a table supported by said carriage, positive jaw clutch controlled mechanism for feeding and reversing said table, and a lever and dial for operating said clutch controlled mechanism.

In witness whereof, I have hereunto set my hand this 13th day of September, 1921.

CONRAD M. CONRADSON.